Figure 1:
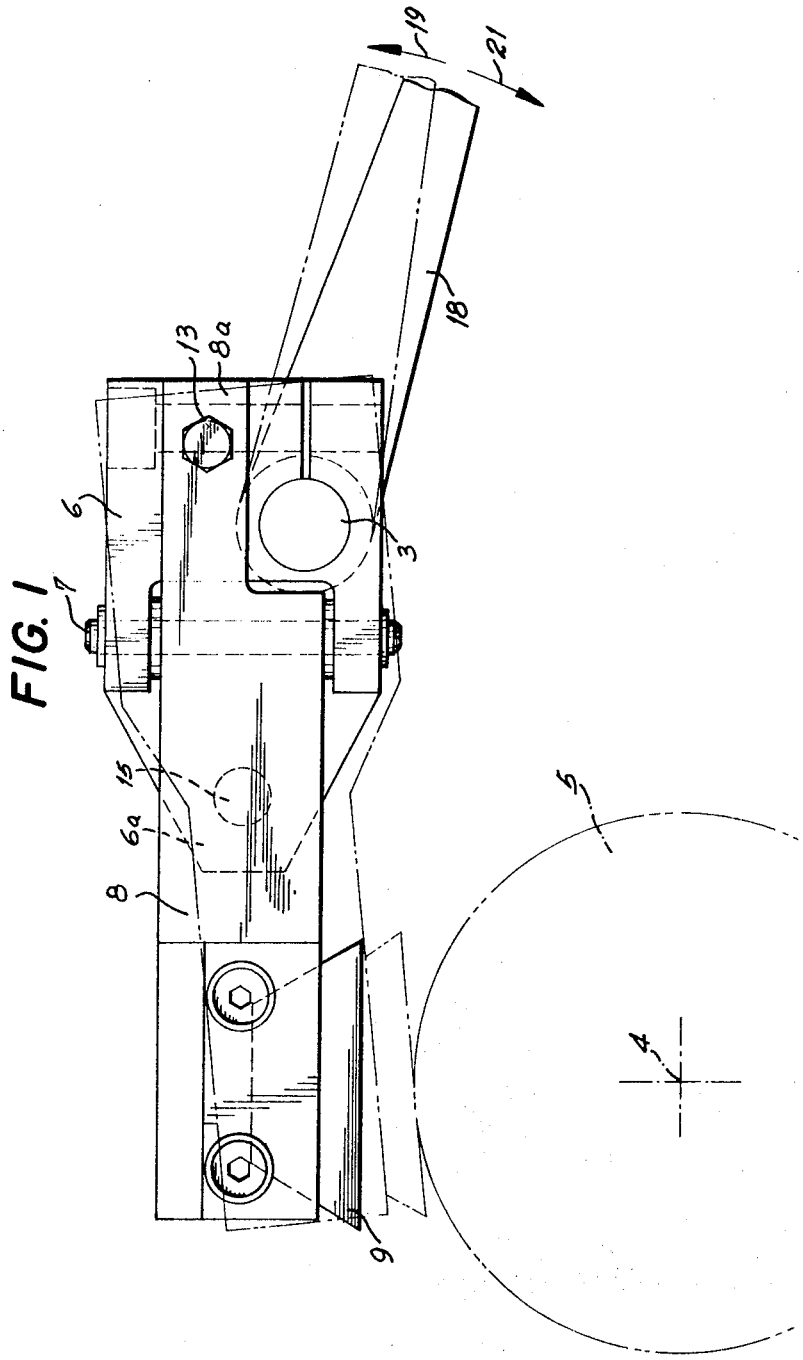

United States Patent

Bourgeois

[15] 3,662,633

[45] May 16, 1972

[54] CUTTING DEVICE FOR MACHINES FOR CUTTING ARTICLES MADE OF BLOWN PLASTICS

[72] Inventor: Jacques Bourgeois, Lyon, France

[73] Assignee: Lesieur-Cotelle, General Leclerc, Boulogne sur Seine, France

[22] Filed: July 1, 1969

[21] Appl. No.: 838,361

[30] Foreign Application Priority Data

July 3, 1968 France..................................50,177

[52] U.S. Cl...................................................82/101, 82/46
[51] Int. Cl. .......................................B23b 3/04, B23b 5/14
[58] Field of Search......................82/46, 47, 46.1, 70.2, 101, 82/102

[56] References Cited

UNITED STATES PATENTS 3,406,598  10/1968  Doucet......................................82/46
3,429,211  2/1969   Pelot..........................................82/46

FOREIGN PATENTS OR APPLICATIONS 865,529  4/1961  Great Britain..............................82/47
868,888  5/1961  Great Britain............................82/101

Primary Examiner—Harrison L. Hinson
Attorney—Waters, Roditi, Schwartz & Nissen

[57] ABSTRACT

A plastic article is rotated about an axis of rotation and a cutting blade mounted on a pivotal arm is moved towards the rotating article proximate a groove therein where the article is to be cut. The arm is resiliently supported to permit transverse movement therein parallel to the axis of rotation and when the blade is lowered against the article, it rides along an inclined surface adjacent the groove so as to be guided into the groove to effect the removable of the undesired waste on the article beyond the groove.

2 Claims, 3 Drawing Figures

CUTTING DEVICE FOR MACHINES FOR CUTTING ARTICLES MADE OF BLOWN PLASTICS

The invention relates to a cutting device for cutting machines, and more particularly, although not exclusively, for vessels or other articles made of blown plastics in which the waste at their upper end, normally called the "expansion head" must be cut off.

More particularly, the present invention relates to cutting machines in which the waste burr is cut off by rotating the article and by applying thereto a cutting blade. In this kind of machine, the rotational movement is normally obtained by means of an arrangement consisting of three revolving rollers of which the parallel axes are offset relative to each other by 120° and of which at least one causes the rotation of the article by frictional engagement. In another known device for producing this rotation, there is provided a rotating cell, inside which the article is subjected to a constant suction which maintains it against the base of the cell.

In the first case, and in view of the thinness of the walls of the articles, it happens frequently that the pressure exerted thereon by the driving roller causes their distortion.

More generally, it happens often that the articles are deformed accidentally during the manipulation preceding the cutting and it is therefore highly probable that, both in the first and second cases, the part of the articoe which is to be cut off, i.e., one of its ends, will make a rotational movement about an axis which does not coincide with its axis of revolution, whereby the cutting operation becomes much more difficult.

The invention has the object of eliminating this disadvantage. To this end, it provided a cutting device for a cutting machine, of the type in which the article to be cut is rotatively driven by suitable means, located at the point of a cutting blade actuated in a manner to effect an approach and a withdrawing movement. This device is characterized in that it comprises a cutting blade which is actuated, on one hand, to effect an approach and cutting movement, i.e., a displacement along its plane, perpendicularly to the axis of rotation of the articles to be cut, and, on the other hand, can move transversely, i.e., parallel to the said axis, wherein the transverse movement is achieved by means of a groove provided to this end in the article to be cut and at the bottom of which the cutting is to be effected.

In a preferred embodiment of the invention, the cutting device is formed by a cutting blade, carried by a hinged arm, mounted in a cover of an axis perpendicular to the axis of rotation of the article to be cut so that the blade can move parallel to the said axis of rotation, wherein the cover is fixed on a shaft parallel to this axis and which, by rotating in one direction or the other, causes the blade to advance, to cut and to withdraw.

Preferably, limit stops are provided which define the angular displacement of the arm carrying the blade in its hinge cover, wherein spring means retain the arm carrying the blade in contact with one of the abutmens so that, in this position, the cutting blade is located in a plane beyond the cutting plane, i.e., of the said groove, re;ative to the aryicle to be cut.

Thus, during its approach movement, the blade makes contact with the edge of the said groove which forms part of the expansion head and this contact causes it to move into the cutting plane, against the force of the above mentioned spring means.

Figure 2:
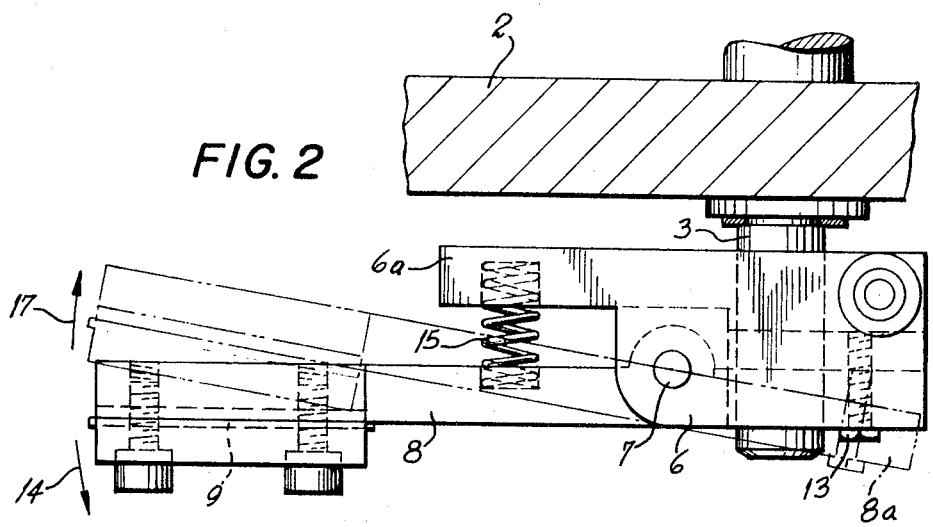
Figure 3:
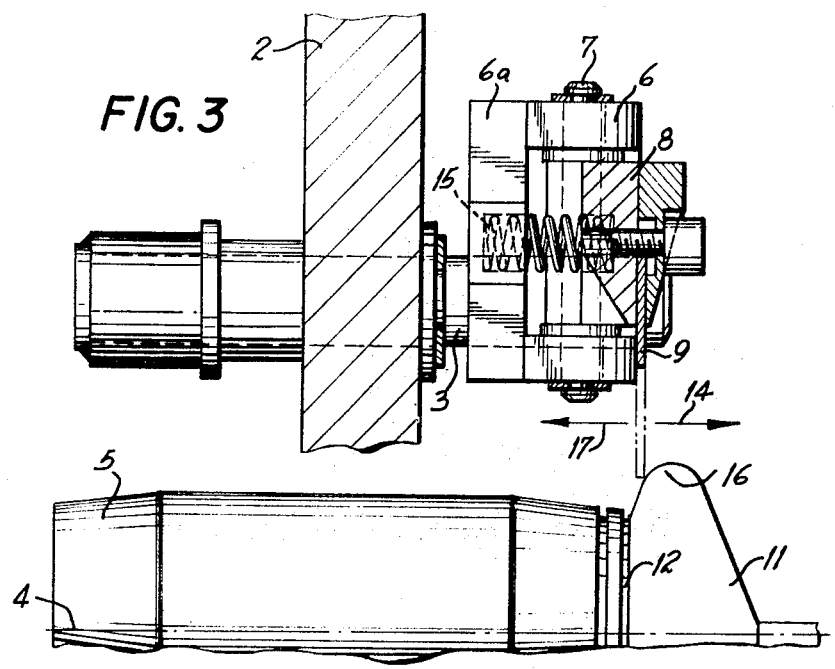

The invention will be further described, by way of example, with reference to the accompanying drawings, showing, by eay of non-limiting example, an embodiment of the cutting device, and in which:

FIG. 1 is a side elevation;
FIG. 2 is a plan view, viewed from below;
FIG. 3 is an end elevation in partial cross-section.

The cutting device shown in the drawing is adapted to be mounted on the frame 2 of a machine for cutting articles made of blown plastics, the machine being of the kind in which the said articles are rotatively driven while the cutting element of the cutting device is applied thereto in order to detach the expansion head from the body of the article.

A shaft 3, the bearings of which are provided on the frame 2 and which is mounted parallel to the axis of rotation 4 of the articles 5 to be cut, there is a pivotable cover 6, the axis 7 of which is perpendicular to the shaft 3 and the axis 4.

An arm 8 is articulately mounted in this cover 6 and carries, on its free end, a cutting blade 9, located in a plane which is perpendicular to the shaft 3 and the axis 4. The length of this arm 8 is such that, by rotating the shaft 3, the blade 9 can be brought into contact with the article to be cut., as shown by dash-dot lines in FIG. 1. The articulation of the arm 8 in the cover 6 permits the blade 9 to follow the possibly deformed profile of the line along which the article 5 is to be cut. To this end, each article 5 to be cut has, between its body and its expansion head 11, a groove 12, at the base of which the cut is made, and the sides of which ensure the automatic guiding of the blade 9.

However, it is necessary that the cut is not started in the wall of the article 5, above the groove 12. To this end, the arm 8 is extended towards the back by a claw 8a, equipped with a screw 13, intended to limit the angular displacement of the arm 8 in the direction of the arrow 14, and resting on the corresponding part of the cover 6, which latter is equipped with a front extension 6a, wherein a spring 15 is compressed between this front extension 6a and and the arm 8, tending to hold the arm 8 in its extreme position, in which the screw 13 abuts the cover 6, as shown in solid in FIGS. 2 and 3. It follows therefrom that the arm 8 is normally in its extreme angular position, corresponding to the end of the movement in the direction of the arrow 14.

As shown in FIG. 3, in this position, the blade 9 is located in a plane perpendicular to the axis 4, which is located beyond the groove 12, relative to the article 5.

As may also be seen from this Figure, the corresponding rim of the groove 12 is formed by a flange 16 provided at the base of the expansion head 11.

Thus, during its appraoch movement, the blade 9 enters into contact only with the flange 16, the slope of which deflects it in the direction of the arrow 17 into the bottom of the groove 12.

For the rotational movement in either direction, in order to impart to the arm 8 and therefore also to the blade 9 their approach movements, as well as the cutting and withdrawing movements, an operating lever 18 is fixed on the shaft 3 and is adapted to be moved in the direcyion of the arrows 19 and 21, by suitable means, such as a mechanical, pneumatic or hydraulic jack, not shown in the drawing.

To permit the device to be adapted to articles of different length and of different shapes,, it is necessary to change the inoperative position of the blade 9. This adjustment can be asily made by means of the abutment screw 13, the axial position of which determines the inoperative position of the arm 8.

It is obvious that the invention is not limited to the embodiment of the cutting device described above merely by way of example; on the contrary, it comprises any possible modifications.

I claim:

1. Apparatus for cutting articles of plastic material comprising means for rotating an article to be cut about a fixed axis of rotation, a cutting blade, an axle extending parallel to said axis of rotation of the article, a cover mounted on said axle for pivotal movement about the axis thereof, an arm carried by said cover and supporting said cutting blade for movement in a plane perpendicular to said axis of rotation of the article towards and away from the article proximate a groove therein whereat the article is to be cut, and means pivotably mounting said arm on said cover for transverse movement in opposite directions parallel to said axis of rotation of the article, the article having an inclined surface adjacent said groove and facing said cutting blade to guide the cutting blade into said groove by transverse movement of the blade when the blade is moved towards the article.

2. Apparatus as claimed in claim 1 comprising abutment means for said cutting blade to limit transverse movement thereof in the direction opposite that in which the blade moves when it enters said groove, and spring means acting on said arm to urge the same against said abutment means.

* * * * *